(12) United States Patent
Orime et al.

(10) Patent No.: US 9,560,313 B2
(45) Date of Patent: Jan. 31, 2017

(54) DIALOGUE SYSTEM AND DIALOGUE METHOD

(71) Applicant: Daiwa House Industry Co., Ltd., Osaka (JP)

(72) Inventors: Takashi Orime, Osaka (JP); Kenji Hirosawa, Osaka (JP); Hiroyuki Yajima, Osaka (JP); Hiroyuki Yoshida, Osaka (JP); Tsukasa Nakano, Osaka (JP)

(73) Assignee: Daiwa House Industry Co., Ltd., Osaka (JP)

( * ) Notice: Subject to any disclaimer, the term of this patent is extended or adjusted under 35 U.S.C. 154(b) by 0 days.

(21) Appl. No.: 15/031,379

(22) PCT Filed: Oct. 21, 2014

(86) PCT No.: PCT/JP2014/077919
§ 371 (c)(1),
(2) Date: Apr. 22, 2016

(87) PCT Pub. No.: WO2015/060290
PCT Pub. Date: Apr. 30, 2015

(65) Prior Publication Data
US 2016/0249014 A1    Aug. 25, 2016

(30) Foreign Application Priority Data
Oct. 22, 2013  (JP) ................................ 2013-219297

(51) Int. Cl.
*H04N 7/15* (2006.01)
*H04N 7/14* (2006.01)
*G06F 3/14* (2006.01)

(52) U.S. Cl.
CPC ............ *H04N 7/141* (2013.01); *G06F 3/1423* (2013.01); *H04N 7/14* (2013.01); *G09G 2370/022* (2013.01); *G09G 2370/16* (2013.01)

(58) Field of Classification Search
USPC ....................................................... 348/14.03
See application file for complete search history.

(56) References Cited

U.S. PATENT DOCUMENTS

| 2010/0194715 A1* | 8/2010 | Hurley ...................... G09G 5/00 345/179 |
| 2015/0070340 A1* | 3/2015 | Trachtenberg ..... H04N 21/4122 345/211 |

FOREIGN PATENT DOCUMENTS

| JP | 07007588 | 1/1995 |
| JP | 200578347 | 3/2005 |

(Continued)

*Primary Examiner* — Creighton Smith
(74) *Attorney, Agent, or Firm* — Young Basile Hanlon & MacFarlane, P.C.

(57) ABSTRACT

A system and method are provided to hold a dialog between communicators while the communicators are viewing their images each other and which prevents the presence of an image display screen from being noticeable in a non-communication state. A first unit for the communicator generates and transmits first data indicating the image of the communicator. A second unit for the communication partner expands the first data received via a communication line to display the image of the communicator on the display screen, and generates and transmits second data indicating the image of the communication partner in front of the display screen. A human sensor is configured to detect that the communication partner is at a predetermined position in a home. Only during the period of the human sensor detecting that the communication partner is at the predetermined position, the display-cum-mirror forms a display screen, and otherwise, a mirror.

8 Claims, 6 Drawing Sheets

(56) References Cited

FOREIGN PATENT DOCUMENTS

| JP | 2009060220 | 3/2009 |
|----|------------|--------|
| JP | 2011139360 | 7/2011 |
| JP | 2013073505 | 9/2011 |
| JP | 2011113206 | 11/2011 |
| JP | 3181046 | 1/2013 |
| JP | 20135253 | 7/2013 |
| WO | WO2009122716 | 10/2009 |

* cited by examiner

FIG. 4B
COMMUNICATION STATE

FIG. 4A
NON-COMMUNICATION STATE

PLEASE SET
COMMUNICATION PARTNER

● PERSON B

○ PERSON C

○ PERSON D

DIALOGUE SYSTEM AND DIALOGUE METHOD

CROSS REFERENCE TO RELATED APPLICATIONS

This application is a National Stage Entry application of PCT Application No. PCT/JP2014/077919, filed Oct. 21, 2014, which claims the priority benefit of Japanese Patent Application No. 2013-219297, filed Oct. 22, 2013, the contents being incorporated herein by reference.

TECHNICAL FIELD

Disclosed herein is a system built for a dialogue between communicators in remote locations and a dialogue method realized by the dialogue system, such as a system and method for holding a dialogue while communicators are viewing their images of each other.

BACKGROUND

A communication technique for holding a dialogue between communicators in remote locations has been already known, and examples of such a technique include video chatting and videotelephony. In recent years, the technique for realizing a dialogue with a higher realistic sensation has been developed (see, e.g., Japanese Patent Document Nos. 2011-113206 A ("the '206 Document") and 2009-60220 A ("the '220 Document").

The '206 Document describes the technique on video communication made while communicators are viewing their images each other. Such a technique uses a display to resemble a single window, and an image of the space, where a communication partner is present, as viewed from a communicator can be displayed on the display according to the point of view of the communicator as if the communicator was, through the window, viewing the space where the communication partner is present (i.e., motion parallax). This allows image display with a depth.

The '220 Document describes a communication system realizing communication between different spots via a network. In such a system, the positions of communicators in communication between different spots are determined. Based on determination results, at least any of the operation of changing microphone sensitivity to sound at the above-described positions or the operation of increasing sound output from a speaker at the above-described positions is performed. Accordingly, voice of the communicators having a dialogue between the different sports can be easily captured.

SUMMARY

While the above-described remote communication technique realizing a dialogue with a high realistic sensation has been already developed, it has been required for such a technique to exhibit excellent operability, and more specifically, exhibit easiness in use by users (communicators). Particularly in the case of requiring a complicated setting operation in a communication terminal such as a personal computer, it is difficult for, e.g., children and elderly adults to handle the system. Regarding this point, the '206 Document and the '220 Document as described above fail to describe the operation performed by the communicators to start the dialogue. Depending on the difficulty of such an operation, there is a probability that it is difficult for the users to use the techniques disclosed in the above-described patent literatures.

In the case where communicators have a dialogue while viewing their images each other via displays, no image is displayed on each display while no dialogue is held, and the space where each display displaying no image is placed becomes useless.

Further, the technique for causing communicators to sense as if the communicators were in the same space has been required for further improvement of a realistic sensation in a dialogue. Particularly according to the technique described in the '206 Document, the communicators sense as if the communicators were viewing each other through the displays. However, because of the communicators viewing each other through the displays, the communicators sense as if the communicators were in different spaces (rooms).

The system described herein has been made in view of the above-described problem, and is intended to provide a dialogue system and a dialogue method requiring no complicated operation to hold a dialogue while communicators are viewing their images each other and preventing each communicator from noticing the presence of an image display screen while no dialogue is held.

Moreover, the system described herein is also intended to cause, using the above-described dialogue system, the communicators to sense as if the communicators were in the same space (the same room) to realize a dialogue with a high realistic sensation.

The above-described problem may be solved by a dialogue system described herein, which is built for a dialogue between a communicator and a communication partner, including a first unit owned by the communicator, and a second unit owned by the communication partner. (A) The first unit includes (a1) a first data generator configured to generate first data indicating an image when the communicator is imaged, and (a2) a first data transmitter configured to transmit the first data to the second unit. (B) The second unit includes (b1) a first data receiver configured to receive the first data via a communication line, (b2) a first data expander configured to expand the first data that has been received by the first data receiver to display the image of the communicator on a display screen, (b3) a detector configured to detect a detection target satisfying a preset condition, the detection target being at least one of the motion performed by the communication partner, the position of the communication partner, the posture of the communication partner, or the sound emitted from the communication partner, (b4) a display screen formation part forming a part of a building material, furniture, or a decoration placed in a building where the communication partner is present and configured to form the display screen, (b5) a second data generator configured to generate second data indicating an image when the communication partner in front of the display screen formed by the display screen formation part is imaged, and (b6) a second data transmitter configured to transmit the second data to the first unit. (C) The display screen formation part shows an external appearance as the part without forming the display screen while the detector is detecting no detection target satisfying the condition, and forms the display screen only while the detector is detecting the detection target satisfying the condition.

In the above-described dialogue system, the communicators have a dialogue while viewing their images each other. When the communication partner views the image of the communicator, the display screen is formed on the display screen formation part owned by the communication partner.

In display screen formation, detection of the detection target satisfying the preset condition is taken as a trigger, supposing that at least one of the motion performed by the communication partner, the position of the communication partner, the posture of the communication partner, or the sound emitted from the communication partner is the detection target. As described above, in the dialogue system, no complicated operation is required as the operation required for display screen formation, and the communication partner can view the image of the communicator by a simple method.

Moreover, in the above-described dialogue system, the display screen formation part displays no display screen during the period of detecting no detection target satisfying the preset condition, i.e., while no dialogue is held between the communicator and the communication partner. Instead, the display screen formation part shows the external appearance as part of the building material, the furniture, or the decoration placed in the building where the communication partner is present. During the period of having no dialogue, the display screen formation part functions as, e.g., the building material. With such a configuration, the display screen becomes less noticeable in the building. As a result, the presence of the display screen becomes less noticeable.

It is more preferable to configure the above-described dialogue system as follows. The first data generator generates the first data indicating the image of the communicator and the sound of the communicator. When the first data receiver has received the first data, the first data expander expands the first data to reproduce the sound of the communicator. When the detector detects the detection target satisfying the condition while the first data expander is reproducing the sound of the communicator, the display screen formation part forms the display screen, and the first data expander displays the image of the communicator on the display screen.

In the above-described configuration, when the first data receiver has received the first data, the first data expander first expands the first data to reproduce the sound of the communicator. In response, the communication partner having caught such sound performs a predetermined operation, moves to a predetermined position, takes a predetermined posture, or emits predetermined sound. When the detector detects such an action as the detection target satisfying the condition, the display screen formation part forms the display screen, using such detection as a trigger. In the above-described configuration, the communicator's sound calling the communication partner is converted into data, and then, the data is transmitted. The sound is reproduced on the communication partner side, and in response to the sound, the communication partner takes action. Accordingly, the display screen is formed. The above-described steps smoothly start the dialogue processing.

It is more preferable to configure the above-described dialogue system as follows. The first unit includes a second data receiver configured to receive the second data via the communication line, a second data expander configured to expand the received second data to display the image of the communication partner on a first-unit-side display screen, and a first-unit-side display screen formation part forming part of a building material, furniture, or a decoration placed in a building where the communicator is present and forming a first-unit-side display screen. When a pre-set display screen formation condition is not satisfied, the first-unit-side display screen formation part shows an external appearance as the part without forming the first-unit-side display screen. When the display screen formation condition is satisfied, the first-unit-side display screen formation part forms the first-unit-side display screen.

In the above-described configuration, the communication unit owned by the communicator also includes the display screen formation part (the first-unit-side display screen formation part) as in the communication unit owned by the communication partner. The display screen formation part forms no display screen while no dialogue is held. Instead, the display screen formation part shows the external appearance as part of the building material, the furniture, or the decoration placed in the building where the communication partner is present. Thus, while no dialogue is held, the display screen formation parts of both of the communicator and the communication partner function as, e.g., the building material. As a result, each display screen becomes less noticeable in the building, and the presence of such a display screen becomes less noticeable.

It is much more preferable to configure the above-described dialogue system as follows. The first unit further includes a specifier configured to specify, when there are several candidates for the communication partner, a second unit of one of the candidates selected as the communication partner by the communicator, and the first data transmitter transmits the first data to the second unit specified by the specifier.

In the above-described configuration, the communication unit (the first unit) owned by the communicator specifies the communication unit (the second unit) of the candidate selected from the candidates for the communication partner by the communicator, and communicates with the specified unit. Thus, even if there are several candidates, the communicator can have a dialogue with the candidate selected as the communication partner by the communicator oneself.

It is more preferable to configure the above-described dialogue system as follows. The first data generator generates the first data indicating the image including an entire body image of the communicator and a surrounding space image of the communicator, and the sound of the communicator. The second data generator generates the second data indicating the image including an entire body image of the communication partner and a surrounding space image of the communication partner, and the sound of the communication partner.

In the above-described configuration, both communicators can have a dialogue while viewing their entire body images and surrounding space images each other. This can cause the communicators to have the dialogue while sensing as if the communicators were in the same room. As a result, the dialogue can be realized with a high realistic sensation.

The above-described problem may be solved by a dialogue method described herein, which is a method for holding a dialogue between a communicator and a communication partner by a first unit owned by the communicator and a second unit owned by the communication partner, including (A) the step of generating, by a first data generator of the first unit, first data indicating an image when the communicator is imaged, (B) the step of transmitting the first data to the second unit by a first data transmitter of the first unit, (C) the step of receiving the first data by a first data receiver of the second unit via a communication line, (D) the step of expanding the first data that has been received by the first data receiver by a first data expander of the second unit to display the image of the communicator on a display screen, (E) the step of detecting, by a detector of the second unit, a detection target satisfying a preset condition, the detection target being at least one of the motion performed by the communication partner, the position of the communication partner, the posture of the communication partner, or the sound emitted from the communication partner, (F) the step of forming a display screen by a display screen formation part of the second unit, (G) the step of generating, by a second data generator of the second unit, second data indicating an image when the communication partner in front of the display screen formation part serving as the display screen is imaged, and (H) the step of transmitting the second data to the first unit by a second data transmitter of the second unit. (I) The step of forming the display screen by the display screen formation part is not performed while the detector is detecting no detection target satisfying the condition, and the display screen formation part shows an external appearance as part of a building material, furniture, or a decoration placed in a building where the communication partner is present. (J) The step of forming the display screen by the display screen formation part is performed only while the detector is detecting the detection target satisfying the condition.

According to the above-described dialogue method, when at least one of the motion performed by the communication partner, the position of the communication partner, the posture of the communication partner, or the sound emitted from the communication partner is the detection target, the display screen including the image of the communicator is formed, using detection of the detection target satisfying the preset condition as a trigger. In the above-described dialogue method, no complicated operation is required for the communication partner in display screen formation. Moreover, according to the above-described dialogue method, the display screen formation part displays no display screen during the period of holding no dialogue between the communicator and the communication partner, and shows the external appearance as part of the building material, the furniture, or the decoration placed in the building where the communication partner is present. As a result, during the period of holding no dialogue, the presence of the display screen becomes less noticeable.

Accordingly, when a dialogue is held while the communicators are viewing their images each other via the display screens, no complicated operation is required, and the presence of each display screen becomes less noticeable while no dialogue is held. Moreover, the communicators sense, when having the dialogue, as if the communicators are in the same space. This realizes the dialogue with a high realistic sensation, and specifically, realizes the situation in which the communicators have the dialogue in the same room.

Accordingly, exhibiting the above-described advantageous effects, a single person living separately from one's family can experience simulated reunion with the family to have a dialogue with the family in the residential space of the family, for example. Alternately, a doctor can make a simulated visit to a patient in a remote location to have a medical interview with the patient. That is, in the case where communicators in remote locations have a dialogue while viewing their images each other, one communicator can obtain an audiovisual effect causing the communicator to sense as if the communicator is having a dialogue with the communication partner in the same space (the same room).

DETAILED DESCRIPTION

A dialogue system and a dialogue method according to an embodiment (hereinafter referred to as a "present embodiment") of the present invention will be described below with reference to drawings. For the sake of simplicity of description, the case where a communicator is referred to as a "person A" and a communication partner is referred to as a "person B" will be described below as a specific example. The "communicator" is a person who initiates a dialogue at the suggestion of the person oneself to talk to the communication partner. On the other hand, the "communication partner" is a person who responds, when the communicator speaks to the person, to the communicator to have the dialogue. As described above, the "communicator" and the "communication partner" are different from each other in positions, i.e., the side speaking to the other side and the side to which the other side speaks. Even when one person is the "communicator" at a certain point, if the other person speaks to this person at a different point, this person becomes the "communication partner."

Moreover, a home of the communicator (the communication partner) will be described below as an example of a building where the communicator (the communication partner) is present. Note that the home is merely an example of the building, and examples of the building other than the home include public facilities such as hospitals and schools, offices, office buildings, private preparatory schools, and culture schools.

Configuration Example of Dialogue System and Method

Figure 1A:
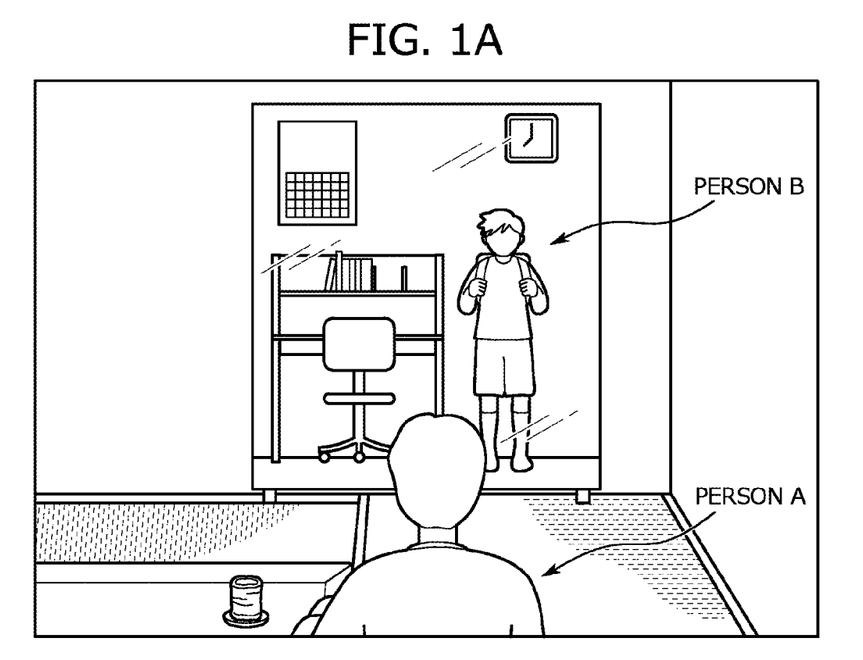
FIGS. 1A and 1B are pictorial image views regarding a dialogue method of an embodiment of the present invention.
Figure 1B:
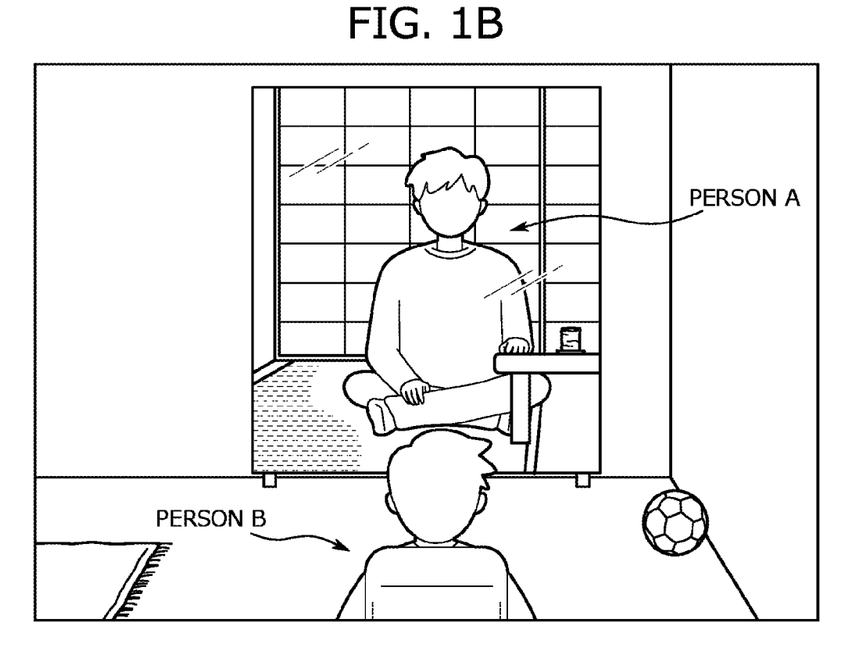

In the present embodiment, the persons A and B can have, using a dialogue system (hereinafter referred to as a "present system S"), a dialogue while viewing their images each other as illustrated in FIGS. 1A and 1B. FIGS. 1A and 1B are views of the images in the dialogue method of the present invention. FIG. 1A is the view from the person A as a communicator, and FIG. 1B is the view from the person B as a communication partner.

The dialogue method of the present embodiment will be more specifically described with reference to FIG. 1. As illustrated in FIG. 1A, the person A can have the dialogue with the person B while viewing the image of the entire body of the person B and the image of the surrounding space (the residential space) of the person B, the images being displayed on a display placed at a home of the person A. Similarly, the person B has the dialogue with the person A while viewing the image of the entire body of the person A and the image of the surrounding space (the residential space) of the person A, the images being displayed on a display at a home of the person B.

As described above, both communicators can have a dialogue while viewing their entire body images and surrounding space images each other even when the communicators are at their own homes. This can cause the communicators to sense as if the communicators were in the same room. As a result, the dialogue can be realized with a high realistic sensation. Note that the "entire body image" is the image of the entire body from the head to the toes. The entire body image may be the image of a standing state or a seated state, and conceptually includes a body image in the state in which part of a body is hidden by an object(s) placed in front of the body.

Figure 2:
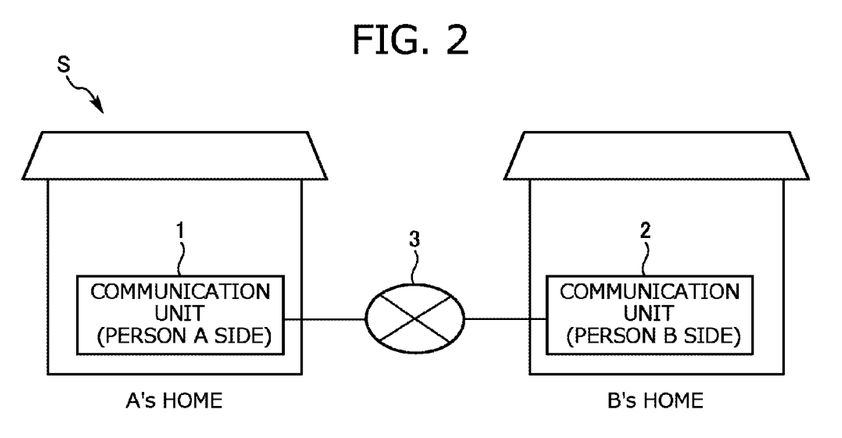
FIG. 2 is a conceptual block diagram of a dialogue system of an embodiment of the present invention.

As illustrated in FIG. 2, the present system S includes communication units 1, 2 placed respectively at the homes of the persons A, B. Data communication between the communication units 1, 2 can be performed via a communication line 3 such as the Internet. FIG. 2 is a conceptual diagram of the present system S.

The data communication between the communication units 1, 2 realizes a dialogue with a high realistic sensation as described above. That is, the present system S including the communication units 1, 2 can be regarded as the system built for holding a dialogue between communicators with a high realistic sensation. Although not shown in FIG. 2, a relay server (a proxy server) is interposed between the communication units 1, 2, and data transmitted/received by each communication unit 1, 2 is relayed to the server.

The communication unit 1 placed at the home of the person A corresponds to a first unit of the present invention, and the communication unit 2 placed at the home of the person B corresponds to a second unit of the present invention. Since both of the communication units 1, 2 have a similar configuration, the configuration of only one (specifically the communication unit 2 for the person B) of the communication units will be described below.

Figure 3:
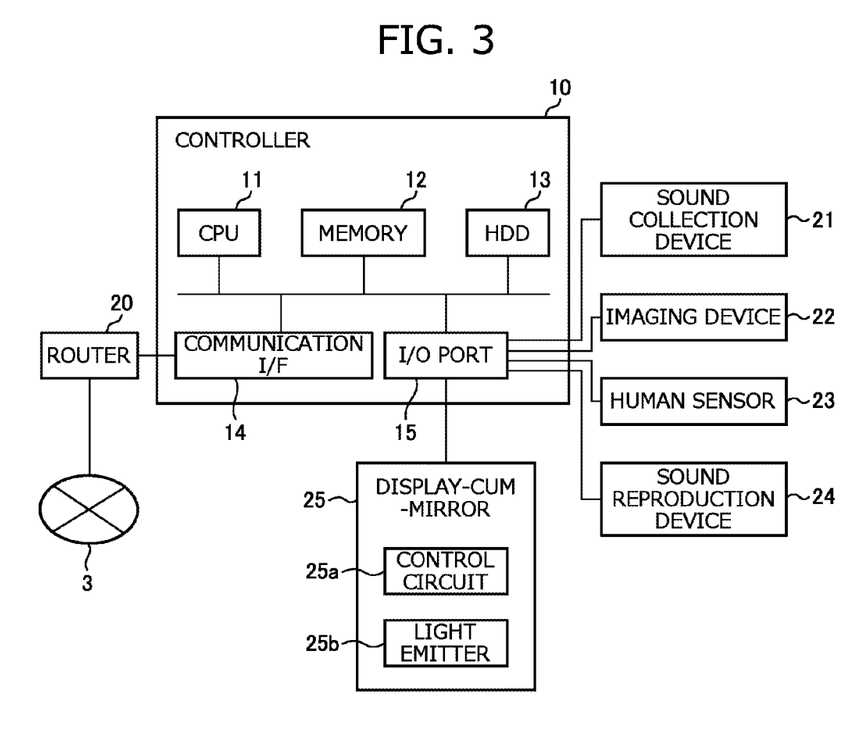
FIG. 3 is a block diagram of a configuration example of first and second units of and embodiment of the present invention.

The configuration of the communication unit 2 will be described. As illustrated in FIG. 3, the communication unit 2 includes, as main components, a controller 10, a router 20, a sound collection device 21, an imaging device 22, a human sensor 23, a sound reproduction device 24, and the display. FIG. 3 is a block diagram of the configuration example of the communication unit 2.

The controller 10 is a centrally-functioning device of the communication unit 2. As illustrated in FIG. 3, the controller 10 includes a CPU 11, a memory 12 including a ROM or a RAM, a hard disk drive 13 (indicated as an "HDD" in FIG. 3), a communication interface 14 (indicated as a "communication I/F" in FIG. 3), and an I/O port 15. The controllers 10 communicate with each other via external equipment (a communication terminal) and the router 20 connected to the communication line 3. Data received from such equipment is stored in the memory 12 or the hard disk drive 13. Note that the equipment communicating with one of the controllers 10 includes the controller 10 of the communication unit 1 for the communication partner.

The memory 12 stores a program (hereinafter referred to as a "dialogue program") for executing a series of data processing for a dialogue. When the dialogue program is read and executed by the CPU 11, various types of data required for a dialogue are generated and transmitted to the communication unit 1 of the transmission destination, or data received from the communication unit 1 of the transmission source is expanded to notify information indicated by the data to the user (the owner of the controller 10). Various types of processing executed by the controller 10 will be specifically described in the following paragraphs.

The sound collection device 21 is a device configured to collect the voice spoken from the user and the sound emitted from the user, and includes a well-known device such as a microphone. The sound collection device 21 outputs a sound signal indicating the collected sound, and the sound signal is input to the I/O port 15 provided at the controller 10.

The imaging device 22 is a device configured to image the figure of the user, and includes a well-known device such as a video camera. In the present embodiment, the imaging device 22 is disposed at such a position that the entire body image of the user and the surrounding space image of the user can be captured. Specifically speaking, the imaging device 22 of the present embodiment is set at such a position that the entire body image of the user and the surrounding space image of the user can be captured when the user stands in front of the display described later. The imaging device 22 outputs a video signal indicating the captured image, and the video signal is input to the I/O port 15 provided at the controller 10.

The human sensor 23 is configured to detect, when a person (the user) is positioned in a detection area of the human sensor 23, the presence of such a person to output a signal indicating a detection result to the controller 10. That is, the human sensor 23 corresponds to an example of a detector of the present invention. Moreover, the position of the communicator (the communication partner) is a detection target of the human sensor 23, and the human sensor 23 detects the position of the communicator (the communication partner) in the detection area of the human sensor 23. Note that well-known equipment can be used as the human sensor 23. Further, in the present embodiment, the human sensor 23 is disposed such that the detection area thereof is positioned in front of the display described later.

The sound reproduction device 24 is a device configured to reproduce sound, and includes a well-known device such as a speaker. The sound reproduction device 24 receives, when the controller 10 expands sound data, a reproduction execution instruction output from the controller 10 to reproduce the sound indicated by the sound data according to the instruction.

The display is a device configured to form a display screen including a video image. Strictly speaking, the display provided at the communication unit 2 for the person B corresponds to a display screen formation part of the present invention. On the other hand, the display provided at the communication unit 1 for the person A corresponds to a first-unit-side display screen formation part of the present invention. The display screen formed by the display corresponds to a first-unit-side display screen.

When the controller 10 expands video data, the display receives a video display instruction output from the controller 10. In response, the image indicated by the video data is displayed on a display screen as the display.

Figure 4A:
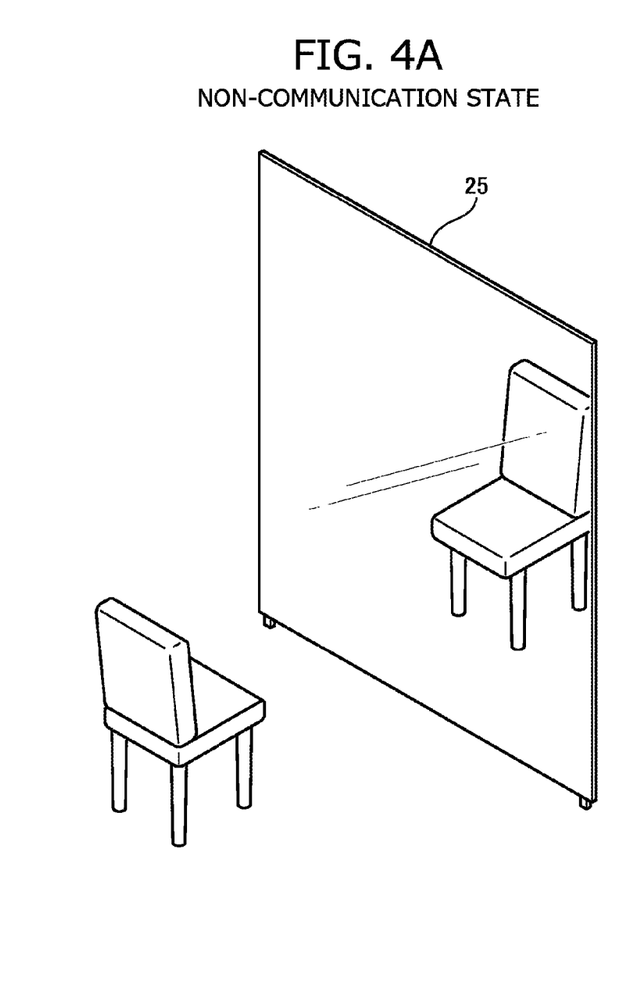
FIGS. 4A and 4B are pictorial views of an example of a display screen formation part of an embodiment of the present invention.
Figure 4B:
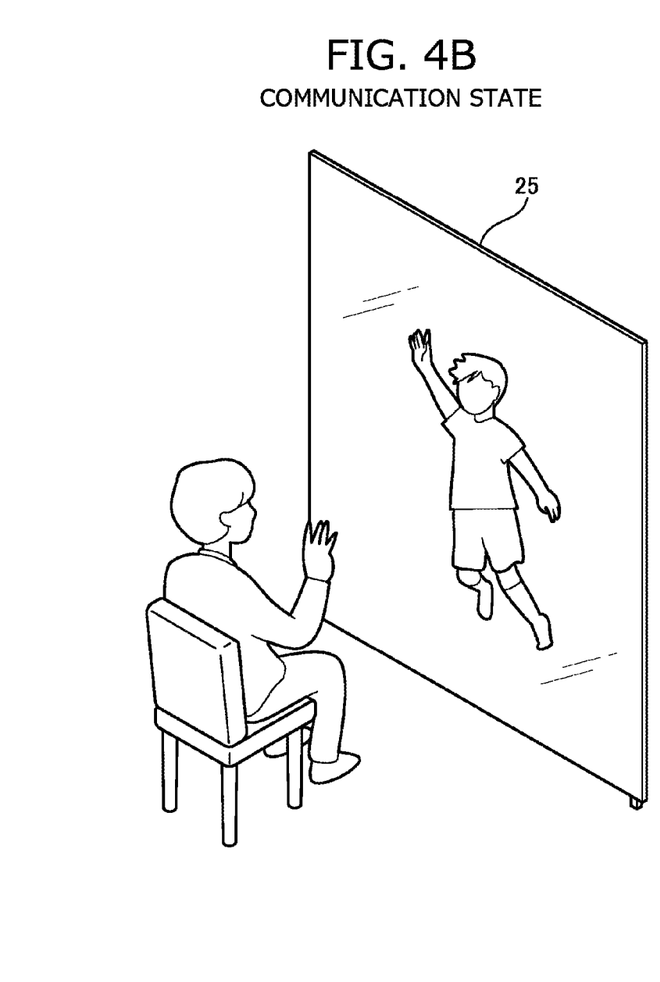

Normally, the display of the present embodiment functions as a decoration, specifically a full-length mirror, placed in the home of the communicator (the communication partner). Only when a dialogue is carried out, the display of the present embodiment serves as the display screen. The display of the present embodiment will be described below with reference to FIG. 3 described above and FIGS. 4A and 4B. FIGS. 4A and 4B are views of the display of the present embodiment. FIG. 4A illustrates a non-communication state when no dialogue is held, and FIG. 4B illustrates a communication state when a dialogue is held.

As described above, the display of the present embodiment forms part of the full-length mirror, specifically a mirrored portion of the full-length mirror, placed in the home where the communicator (the communication partner) is present. In the non-communication state as illustrated in FIG. 4A, the display of the present embodiment does not form the display screen, and shows an external appearance as the mirrored portion. On the other hand, in the communication state as illustrated in FIG. 4B, the display of the present embodiment forms the display screen, and the image is displayed on the display screen.

As described above, the display of the present embodiment includes a display-cum-mirror 25, and is freely switchable between a display screen formation state and a display screen deletion state. More specifically, the display-cum-mirror 25 includes, as illustrated in FIG. 3, a control circuit 25a and a light emitter 25b. When the control circuit 25a has received a display screen formation instruction output from the controller 10 to light up the light emitter 25b according to the instruction, the display screen is formed on the mirrored portion of the display-cum-mirror 25.

On the other hand, while no display screen formation instruction is output, the control circuit 25a maintains the light emitter 25b at a light-off state. Thus, the mirrored portion of the display-cum-mirror 25 shows a normal external appearance. As described above, the display-cum-mirror 25 serving as the display screen in the communication state functions as the full-length mirror in the non-communication state when no dialogue is held. With such a configuration, the display-cum-mirror 25 becomes less noticeable at the home of the communicator (the communication partner). As a result, the presence of the display screen becomes less noticeable. Note that a well-known configuration as described in, e.g., International Patent Publication No. 2009/122716 may be employed as the configuration of the display-cum-mirror 25.

Processing Executed by Controller

Next, various types of processing executed by the above-described controller 10 when the communicators have a dialogue will be described.

The processing executed by the controller 10 is implemented in such a manner that the CPU 11 reads and executes the dialogue program stored in the memory 12, and are specifically the following types (1) to (5) of processing:
(1) dialogue data generation processing;
(2) dialogue data transmission processing;
(3) dialogue data receiving processing;
(4) dialogue data expansion processing; and
(5) display screen formation instruction processing.

Each type of processing will be separately described below.

(1) Dialogue Data Generation Processing

The dialogue data generation processing is the processing of generating sound data and video data by encoding digitalized signals, specifically digitalized sound and video signals, received from the sound collection device 21 and the imaging device 22 by the controller 10 via the I/O port 15 and multiplexing these two types of data to generate dialogue data. Note that the generated dialogue data is temporarily stored in a predetermined area of the memory 12 of the controller 10.

The dialogue data will be described. The dialogue data generated by the controller 10 for the person A as the communicator corresponds to first data of the present invention, and indicates the image of the person A acquired by the imaging device 22 and the sound (voice) of the person A collected by the sound collection device 21. That is, in the controller 10 for the person A, the CPU 11 and the memory 12 cooperate with the dialogue program to serve as a first data generator configured to generate the dialogue data corresponding to the first data.

On the other hand, the dialogue data generated by the controller for the person B as the communication partner corresponds to second data of the present invention, and indicates the image of the person B acquired by the imaging device 22 and the sound (voice) of the person B collected by the sound collection device 21. That is, in the controller 10 for the person B, the CPU 11 and the memory 12 cooperate with the dialogue program to serve as a second data generator configured to generate the dialogue data corresponding to the second data.

As described above, the imaging device 22 of the present embodiment acquires the entire body image of the person A or B and the surrounding space image of the person A or B when the person A or B stands in front of the display-cum-mirror 25 serving as the display screen. Thus, the above-described dialogue data indicates the entire body image and the surrounding space image of the person A or B standing in front of the display-cum-mirror 25 serving as the display screen.

(2) Dialogue Data Transmission Processing

The dialogue data transmission processing is the processing of transmitting the dialogue data generated by the above-described dialogue data generation processing to the communication unit 1, 2 of the destination. That is, in the present processing, the CPU 11 reads the dialogue data stored in the memory 12 to transmit the dialogue data via the communication interface 14 and the router 20. In other words, the CPU 11, the memory 12, the communication interface 14, and the router 20 cooperate with the dialogue program to serve as a data transmitter. Strictly speaking, the CPU 11, the memory 12, and the communication interface 14 in the controller 10 for the person A and the router 20 together form a first data transmitter, and the CPU 11, the memory 12, and the communication interface 14 in the controller 10 for the person B and the router 20 together form a second data transmitter.

(3) Dialogue Data Receiving Processing

The dialogue data receiving processing is the processing of receiving, via the communication line 3, the dialogue data transmitted from the communication unit 1, 2 of the source. That is, in the present processing, the CPU 11 receives the dialogue data from the communication line 3 via the communication interface 14 and the router 20. The CPU 11, the memory 12, the communication interface 14, and the router 20 cooperate with the dialogue program to serve as a data receiver. Strictly speaking, the CPU 11, the memory 12, and the communication interface 14 in the controller 10 for the person B and the router 20 together form a first data receiver, and the CPU 11, the memory 12, and the communication interface 14 in the controller 10 for the person A and the router 20 together form a second data receiver.

Note that the received dialogue data is saved in a predetermined area of the memory 12 of the controller 10 or the hard disk drive 13 of the rear header 10.

(4) Dialogue Data Expansion Processing

The dialogue data expansion processing is the processing of extracting video data and sound data from the dialogue data received in the above-described dialogue data receiving processing to reproduce the sound indicated by the sound data by the sound reproduction device 24 and to display the image indicated by the video data on the display-cum-mirror 25 serving as the display screen. The present processing is executed in such a manner that the controller 10 controls the sound reproduction device 24 and the display-cum-mirror 25 by the function of the dialogue program. That is, the CPU 11, the memory 12, the sound reproduction device 24, and the display-cum-mirror 25 cooperate with the dialogue program to serve as a data expander.

Strictly speaking, the CPU 11 and the memory 12 in the controller 10 for the person B, the sound reproduction device 24, and the display-cum-mirror 25 cooperate with the dialogue program to serve as a first data expander configured to expand the dialogue data corresponding to the first data. Thus, the image including the entire body image of the person A and the surrounding space image of the person A is displayed on the display screen, and the sound of the person A is reproduced by the sound reproduction device 24.

Similarly, the CPU 11 and the memory 12 in the controller 10 for the person A, the sound reproduction device 24, and the display-cum-mirror 25 cooperate with the dialogue program to serve as a second data expander configured to expand the dialogue data corresponding to the second data. Thus, the image including the entire body image of the person B and the surrounding space image of the person B is displayed on the display screen, and the sound of the person B is reproduced by the sound reproduction device 24.

The dialogue data expansion processing will be more specifically described. After reading the dialogue data stored in the memory 12 or the hard disk drive 13, the CPU 11 divides the above-described dialogue data by the function of the dialogue program to extract video data and sound data. The extracted video data and the extracted sound data are each decoded by the function of the dialogue program. Subsequently, the CPU 11 expands the decoded sound data to generate a reproduction execution instruction for reproducing the sound indicated by the sound data, specifically the voice of the communicator (the communication partner). Then, the CPU 11 outputs the generated reproduction execution instruction to the sound reproduction device 24, and the sound reproduction device 24 reproduces, according to the instruction, the sound indicated by the above-described sound data.

Moreover, the CPU 11 expands the decoded video data to display the image (i.e., the entire body image of the communicator (the communication partner) and the surrounding space image of the communicator (the communication partner)) indicated by the video data on the display-cum-mirror 25 serving as the display screen. Specifically speaking, the CPU 11 generates a display instruction (a video display instruction) regarding the above-described image to output the instruction to the display-cum-mirror 25. After having received the video display instruction, the control circuit 25*a* of the display-cum-mirror 25 controls the light emitter 25*b* according to the instruction. Accordingly, the entire body image of the communicator (the communication partner) and the surrounding space image of the communicator (the communication partner) are displayed on the display-cum-mirror 25 serving as the display screen.

(5) Display Screen Formation Instruction Processing

The display screen formation instruction processing is the processing of generating, using satisfaction of a display screen formation condition as a trigger, a display screen formation instruction in the state in which the display-cum-mirror 25 forms no display screen and outputting the instruction to the display-cum-mirror 25. The display screen formation condition is preset as the condition where the display-cum-mirror 25 forms the display screen. In the present embodiment, the display screen formation condition is that the human sensor 23 detects the position of the communicator (the communication partner) in the detection area of the human sensor 23.

Specifically speaking, the detection area of the human sensor 23 is set at the position in front of the display-cum-mirror 25, e.g., the position somewhat closer to the display-cum-mirror 25 as compared to the user's position when the display-cum-mirror 25 is used as the full-length mirror. Thus, when the communicator (the communication partner) is, as illustrated in FIG. 4B, positioned closer to the display-cum-mirror 25 as compared to a normal position, the human sensor 23 detects the position of the communicator (the communication partner) in the detection area of the human sensor 23 to output a signal (hereinafter referred to as a "detection signal") indicating a detection result to the controller 10. In the controller 10 having received the detection signal via the I/O port 15, the CPU 11 executes the dialogue program to generate an instruction (a display screen formation instruction) for forming the display screen on the display-cum-mirror 25. Then, the CPU 11 outputs the instruction to the display-cum-mirror 25.

Then, in the display-cum-mirror 25 having received the display screen formation instruction, the control circuit 25*a* lights up the light emitter 25*b* according to the display screen formation instruction. Thus, the display screen is formed on the mirrored portion of the display-cum-mirror 25 having showed the external appearance as the full-length mirror so far.

As described above, the CPU 11 and the memory 12 of the controller 10 cooperate with the dialogue program to serve as a display screen formation instruction output. Thus, the display screen formation instruction is generated using detection of the communicator's position (the communication partner's position) in the detection area by the human sensor 23 as a trigger, and then, is output to the display-cum-mirror 25.

In the present embodiment, while the human sensor 23 is detecting the position of the communicator (the communication partner) in the detection area of the human sensor 23, the display-cum-mirror 25 is maintained in the state in which the display-cum-mirror 25 forms the display screen. On the other hand, when the human sensor 23 no longer detects the communicator (the communication partner) in the detection area of the human sensor 23, the display-cum-mirror 25 deletes the display screen, and the mirrored portion of the display-cum-mirror 25 shows the external appearance as the full-length mirror. That is, in the present embodiment, while the human sensor 23 is not detecting the position of the communicator (the communication partner) in the detection area of the human sensor 23, the display-cum-mirror 25 forms no display screen, and the mirrored portion of the display-cum-mirror 25 shows the external appearance as part of the full-length mirror. In other words, only while the human sensor 23 is detecting the position of the communicator (the communication partner) in the detection area of the human sensor 23, the display-cum-mirror 25 forms the display screen.

In the present embodiment, when the display-cum-mirror 25 forms the display screen, the display-cum-mirror 25 begins imaging the entire body of the communicator (the communication partner) in front of the mirror 25 and the surrounding space of the communicator (the communication partner) and collecting the sound emitted from the communicator (the communication partner). That is, in the present embodiment, imaging by the imaging device 22 and sound collection by the sound collection device 21 are started using detection of the communicator's position (the communication partner's position) in the detection area by the human sensor 23 as a trigger. Accordingly, the controller 10 executes the dialogue data generation processing to generate the dialogue data based on the signals output from the imaging device 22 and the sound collection device 21. After completion of generation of the dialogue data, the controller 10 executes the dialogue data transmission processing to transmit the generated dialogue data to the communication unit 1, 2 of the other side.

Example of Steps of Dialogue Method of the Present Embodiment

Next, the dialogue method of the present embodiment will be described in more detail. Note that the case where the communicator is the person A and the communication partner is the person B will be described below as a specific example as in the description made above.

Figure 5:
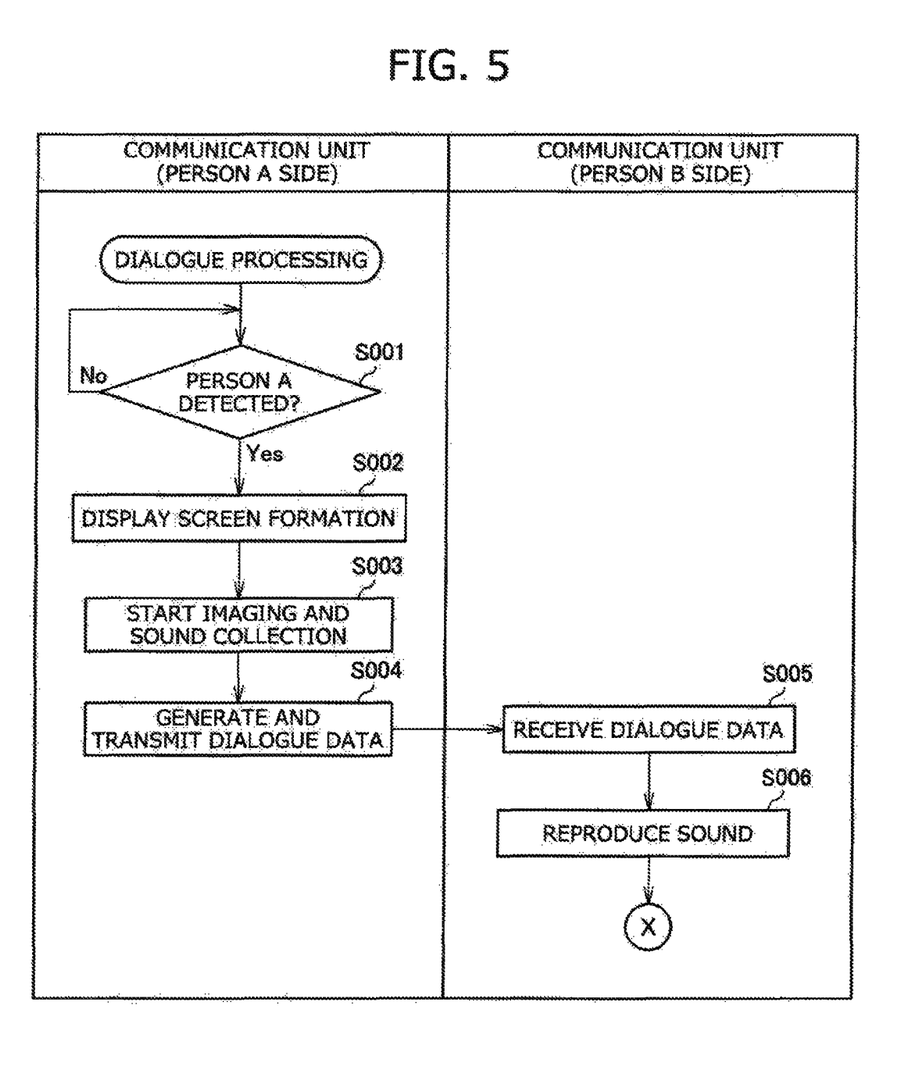
FIG. 5 is a flowchart of the processing executed by the dialogue system of an embodiment of the present invention.
Figure 6:
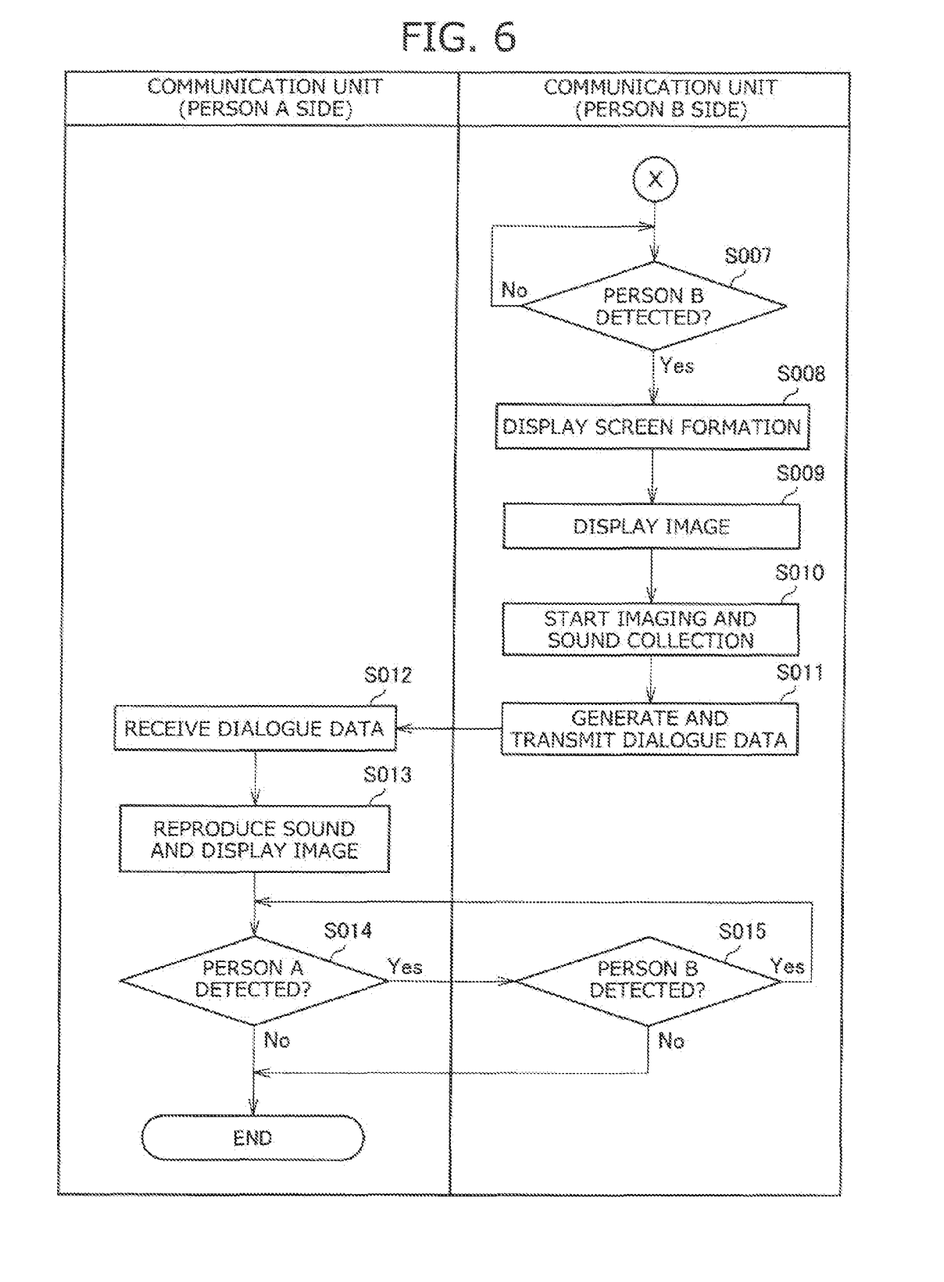
FIG. 6 is another flowchart of the processing executed by the dialogue system of an embodiment of the present invention.

The dialogue method of the present embodiment is implemented by the dialogue processing executed by the present system S. Specifically, the dialogue method of the present embodiment is implemented in such a manner that the communication units 1, 2 for the communicator and the communication partner sequentially perform data processing according to the flow shown in FIGS. 5 and 6. FIGS. 5 and 6 are flowcharts of the dialogue processing executed by the present system S.

The flow in the dialogue processing will be specifically described below with reference to FIGS. 5 and 6.

The dialogue processing first begins when the person A moves to the front of the display-cum-mirror 25 placed at the home of the person A and the human sensor 23 detects the position of the person A in the detection area of the human sensor 23 (S001). Then, when having received the signal indicating the detection result made by the human sensor 23 via the I/O port 15 ("Yes" at S001), the controller 10 provided at the communication unit 1 for the person A executes the display screen formation instruction processing. Thus, the display-cum-mirror 25 at the person A's residence switches from the state in which the mirrored portion of the display-cum-mirror 25 shows the external appearance as the full-length mirror, and therefore, a display screen is displayed on the mirrored portion (S002). Note that the display screen shows a predetermined standby display screen when the display-cum-mirror 25 at the person A's residence serves as the display screen.

Meanwhile, the sound collection device 21 and the imaging device 22 operate, in response to execution of the display screen formation instruction, to acquire the image including the entire body image of the person A and the surrounding space image of the person A and to collect the voice of the person A (S003). Subsequently, the controller 10 provided at the communication unit 1 for the person A executes the dialogue data generation processing to generate dialogue data based on the signals output from the sound collection device 21 and the imaging device 22. Further, such a controller 10 executes the dialogue data transmission processing to transmit the generated dialogue data to the communication unit 2 for the person B (S004).

In the communication unit 2 for the person B, the controller 10 receives the dialogue data via the communication interface 14 (S005), and accordingly, executes the dialogue data expansion processing. In such processing, sound data is first extracted from the dialogue data, and the sound indicated by the sound data is reproduced by the sound reproduction device 24 (S006). As a result, the sound of the person A, e.g., the voice of the person A calling the person B, is reproduced at the person B's residence. The person B moves to the front of the display-cum-mirror 25 placed at the home of the person B to respond to the voice of the person A.

When the human sensor 23 detects, at the person B's residence, the position of the person B in the detection area of the human sensor 23 while the controller 10 is reproducing the sound of the person A (S007), the controller 10 receives the signal indicating the detection result made by the human sensor 23 via the I/O port 15, and accordingly, executes the display screen formation instruction processing. Thus, the display-cum-mirror 25 at the person B's residence switches from the state in which the mirrored portion of the display-cum-mirror 25 shows the external appearance as the full-length minor, and a display screen is formed on the mirrored portion (S008).

After the display screen has been formed, the controller 10 provided at the communication unit 2 for the person B continues the dialogue data expansion processing. At this point, the controller 10 extracts sound data and video data from the dialogue data to expand both types of data. That is, the controller 10 uses the sound reproduction device 24 to reproduce the sound indicated by the extracted sound data, and causes the display screen to display the image indicated by the extracted video data (S009). Thus, at the person B's residence, the sound of the person A is reproduced, and the image including the entire body image of the person A and the surrounding space image of the person A is displayed on the display screen.

Meanwhile, with execution of the display screen formation instruction, the sound collection device 21 and the imaging device 22 also operate at the person B's residence, and therefore, the image including the entire body image of the person B and the surrounding space image of the person B is acquired, and the voice of the person B is collected (S010). Subsequently, the controller 10 provided at the communication unit 2 for the person B executes the dialogue data generation processing to generate dialogue data based on the signals output from the sound collection device 21 and the imaging device 22. Then, the dialogue data transmission processing is executed to transmit the generated dialogue data to the communication unit 1 for the person A (S011).

Then, when having received the dialogue data via the communication interface 14 (S012), the controller 10 provided at the communication unit 1 for the person A executes the dialogue data expansion processing. In such processing, the controller 10 extracts sound data and video data from the received dialogue data to expand both types of data. That is, the controller 10 uses the sound reproduction device 24 to reproduce the sound indicated by the extracted sound data, and displays the image indicated by the extracted video data on the display screen (S013). Thus, at the person A's residence, the sound of the person B is reproduced, and the image including the entire body image of the person B and the surrounding space image of the person B is displayed on the display screen which has been in a standby state.

Subsequently, while a dialogue between the communicators continues, the processing for generating, transmitting, receiving, and expanding the dialogue data is repeated at each of the communication units 1, 2. When the human sensor 23 no longer detects the person in the detection area of the human sensor 23 at either one of the homes of the persons A, B (S014, S015), the dialogue processing is completed. More specifically, at the home where the human sensor 23 no longer detects the person, the display screen formed on the display-cum-mirror 25 is deleted, and the sound collection device 21 and the imaging device 22 are stopped. Upon completion of the dialogue, when the person standing in front of the display-cum-mirror 25 is left and the human sensor 23 no longer detects the person in the detection area of the human sensor 23 at the other home, the display screen formed on the display-cum-mirror 25 is deleted, and the sound collection device 21 and the imaging device 22 are stopped.

Other Embodiments

In the above-described embodiment, the dialogue system and method have been described as an example. Note that the above-described embodiment is described for the sake of easy understanding, and does not limit the present invention. Change and modification can be made to the present invention without departing from the gist of the present invention. Needless to say, the present invention includes all equivalents.

In the above-described embodiment, the human sensor 23 configured to detect the position of the communicator (the communication partner) has been described as an example of the detector, and it is switchable between the display screen formation state and the display screen deletion state depending on the detection result of the human sensor 23. Note that equipment other than the human sensor 23 may be used as the detector. That is, the detector may detect, as the configuration for implementing the present invention, the detection target satisfying a preset condition(s) when at least one of the motion performed by the communicator (the communication partner), the position of the communicator (the communication partner), the posture of the communicator (the communication partner), or the sound emitted from the communicator (the communication partner). For example, a sound sensor configured to react with, e.g., person's footsteps or voice may be employed as the detector, and a display screen may be formed when the sound with a predetermined volume has been detected. A well-known configuration as described in, e.g., Japanese Patent Document Nos. 2013-73505 A and 2005-78347 A can be used as the configuration targeted for sound.

In the above-described embodiment, the display-cum-mirror 25 functioning as the full-length mirror in the normal state (the non-communication state) has been described as an example of the display screen formation part, but the present invention is not limited to the full-length mirror. That is, the display screen formation part may be other than the full-length mirror as long as the display screen formation part forms part of a building material, furniture, or a decoration placed at each home and is freely switchable between the display screen formation state and the display screen deletion state depending on the detection result of the detector. For example, a building material forming a door or an inner wall of a residence or furniture such as a drawer may be employed as the display screen formation part.

In the above-described embodiment, the display-cum-mirror 25 on the communicator side forms the display screen at the beginning of the dialogue processing, but the display screen displays the standby screen without the image of the communication partner until the dialogue data is transmitted from the communication partner. Note that the present invention is not limited to such a configuration, and the image of the communication partner may be displayed on the display screen by, e.g., expansion of video data contained in previously-received dialogue data until the dialogue data of the communication partner is transmitted.

In order to hold a dialogue, a real-time image (including an image with a delay of several seconds due to data transmission/reception) is typically displayed on the display-cum-mirror 25 serving as the display screen. However, the present invention is not limited to such an image. That is, the video data contained in the previously-received dialogue data is, as described above, expanded such that a previously-acquired image is displayed on the display screen.

In the above-described embodiment, the case where the communicator has a dialogue with a single person preselected as the communication partner has been described as an example. Note that the present invention is not limited to such a case, and an embodiment of the present invention is applicable to the case where there are several candidates for the communication partner. Such a case will be described. When there are several (e.g., four) candidates for the communication partner, the communicator selects any one of the candidates as the communication partner, and a selection result is stored in the communication unit 1 for the communicator.

Figure 7:
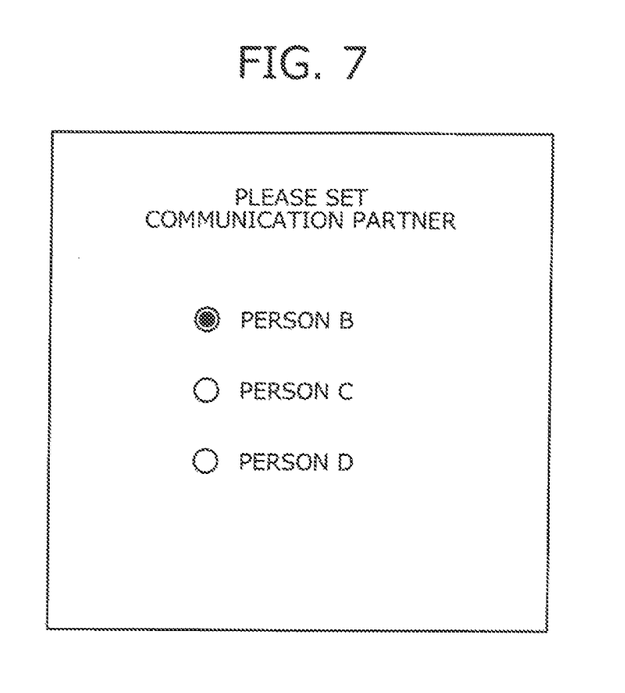
FIG. 7 is a view of an example of an input display screen for selecting a communication partner.

Specifically speaking, the communicator starts predetermined application software at a not-shown PC, a not-shown smartphone, or a not-shown tablet terminal (hereinafter referred to as an "input terminal") owned by the communicator oneself. The function of the application software displays a setting screen illustrated in FIG. 7 on a screen of the input terminal. When the communicator selects any one of the candidates on a setting screen, the data indicating a selection result is generated by the input terminal, and the data is transmitted to the communication unit 1 via a home network.

Based on the data received from the input terminal, the controller 10 of the communication unit 1 specifies the communication unit 2 of the candidate selected as the communication partner by the communicator. Strictly speaking, the controller 10 of the communication unit 1 specifies a MAC address assigned to the communication unit 2. Such processing involves the CPU 11, the memory 12, and the communication interface 14 in the controller 10, and is implemented by the function of the dialogue program. In other words, the CPU 11, the memory 12, and the communication interface 14 in the controller 10 provided at the communication unit 1 for the communicator cooperate with the dialogue program to serve as a specifier configured to specify the communication unit 2 for the candidate selected as the communication partner by the communicator.

Then, the controller 10 of the communication unit 1 transmits the generated dialogue data to the specified communication unit 2. Subsequently, data communication between the communication units 1, 2 is performed by the steps similar to those of the above-described embodiment, and therefore, a series of processing for a dialogue (dialogue processing) is executed. With the above-described configuration, it can be ensured that the communicator sets the candidate selected by the communicator oneself as the communication partner in order to have a dialogue. Note that selection of the communication partner is not limited to the case of selecting the communication partner via the setting screen illustrated in FIG. 7, and other methods (e.g., the method for selecting the communication partner by sound input) may be used.

REFERENCE CHARACTER LIST

S: present system
1, 2: communication unit (first unit, second unit)
3: communication line
10: controller 11: CPU
12: memory
13: hard disk drive
14: communication interface
15: I/O port
20: router
21: sound collection device
22: imaging device
23: human sensor (detector)
24: sound reproduction device
25: display-cum-mirror (display screen formation part)
　25a: control circuit
　25b: light emitter

The invention claimed is:

1. A dialogue system built for a dialogue between a communicator and a communication partner, comprising:
a first unit of the communicator; and
a second unit of the communication partner,
wherein:
the first unit comprises:
a first data generator configured to generate first data indicating an image when the communicator is imaged; and
a first data transmitter configured to transmit the first data to the second unit;
the second unit comprises:
a first data receiver configured to receive the first data via a communication line;
a first data expander configured to expand the first data that has been received by the first data receiver to display the image of the communicator on a display screen;
a detector configured to detect a detection target satisfying a preset condition, the detection target being at least one of:
a motion performed by the communication partner,
a position of the communication partner,
a posture of the communication partner, and
a sound emitted from the communication partner;
a display screen formation part forming a part of a building material, furniture, or a decoration placed in a building where the communication partner is present and configured to form a display screen;
a second data generator configured to generate second data indicating an image when the communication partner in front of the display screen formed by the display screen formation part is imaged; and
a second data transmitter configured to transmit the second data to the first unit; and
the display screen formation part shows an external appearance as the part without forming the display screen while the detector is detecting no detection target satisfying the condition, and forms the display screen only while the detector is detecting the detection target satisfying the condition.

2. The dialogue system of claim 1, wherein:
the first data generator generates the first data indicating the image of the communicator and sound of the communicator;
when the first data receiver receives the first data, the first data expander expands the first data to reproduce the sound of the communicator; and
when the detector detects the detection target satisfying the condition while the first data expander is reproducing the sound of the communicator, the display screen formation part forms the display screen, and the first data expander displays the image of the communicator on the display screen.

3. The dialogue system of claim 2, wherein:
the first unit comprises:
a second data receiver configured to receive the second data via the communication line;
a second data expander configured to expand the second data that has been received by the second data receiver to display the image of the communication partner on a first-unit-side display screen; and
a first-unit-side display screen formation part forming part of a building material, furniture, or a decoration placed in a building where the communicator is present and forming a first-unit-side display screen;
when a preset display screen formation condition is not satisfied, the first-unit-side display screen formation part shows an external appearance as the part without forming the first-unit-side display screen; and
when the display screen formation condition is satisfied, the first-unit-side display screen formation part forms the first-unit-side display screen.

4. The dialogue system of claim 3, wherein:
the first unit further comprises:
a specifier configured to specify, when there are several candidates for the communication partner, the second unit of one of the candidates selected as the communication partner by the communicator; and
the first data transmitter transmits the first data to the second unit specified by the specifier.

5. The dialogue system of claim 2, wherein:
the first data generator generates the first data indicating the image including an entire body image of the communicator and a surrounding space image of the communicator, and the sound of the communicator; and
the second data generator generates the second data indicating the image including an entire body image of the communication partner and a surrounding space image of the communication partner, and the sound of the communication partner.

6. A method for having a dialogue between a communicator and a communication partner by a first unit owned by the communicator and a second unit owned by the communication partner, the method comprising:
generating, by a first data generator of the first unit, first data indicating an image when the communicator is imaged;
transmitting the first data to the second unit by a first data transmitter of the first unit;
receiving the first data by a first data receiver of the second unit via a communication line;
expanding the first data that has been received by the first data receiver by a first data expander of the second unit to display the image of the communicator on a display screen;
detecting, by a detector of the second unit, a detection target satisfying a preset condition, the detection target being at least one of a motion performed by the communication partner, a position of the communication partner, a posture of the communication partner, and a sound emitted from the communication partner;
forming a display screen by a display screen formation part of the second unit;
generating, by a second data generator of the second unit, second data indicating an image when the communication partner in front of the display screen formation part serving as the display screen is imaged; and transmitting the second data to the first unit by a second data transmitter of the second unit;

wherein:

the forming of the display screen by the display screen formation part is not performed while the detector is detecting no detection target satisfying the condition; and the display screen formation part shows an external appearance as part of a building material, furniture, or a decoration placed in a building where the communication partner is present; and the forming of the display screen by the display screen formation part is performed only while the detector is detecting the detection target satisfying the condition.

7. The dialogue system of claim 3, wherein:

the first data generator generates the first data indicating the image including an entire body image of the communicator and a surrounding space image of the communicator, and the sound of the communicator; and the second data generator generates the second data indicating the image including an entire body image of the communication partner and a surrounding space image of the communication partner, and the sound of the communication partner.

8. The dialogue system of claim 4, wherein:

the first data generator generates the first data indicating the image including an entire body image of the communicator and a surrounding space image of the communicator, and the sound of the communicator; and the second data generator generates the second data indicating the image including an entire body image of the communication partner and a surrounding space image of the communication partner, and the sound of the communication partner.

\* \* \* \* \*